(12) United States Patent
Leskinen et al.

(10) Patent No.: US 6,689,846 B1
(45) Date of Patent: Feb. 10, 2004

(54) PROCESS OF PRODUCING α-OLEFIN POLYMERS

(75) Inventors: Pauli Leskinen, Helsinki (FI); Kauno Alastalo, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/959,651

(22) PCT Filed: May 4, 2000

(86) PCT No.: PCT/FI00/00398

§ 371 (c)(1),
(2), (4) Date: Nov. 2, 2001

(87) PCT Pub. No.: WO00/66640

PCT Pub. Date: Nov. 9, 2000

(30) Foreign Application Priority Data

May 4, 1999 (FI) .................................................. 991015

(51) Int. Cl.[7] .................................................. C08F 2/38
(52) U.S. Cl. .............................. 526/82; 526/64; 526/68; 526/65; 526/84; 526/201
(58) Field of Search .............................. 526/65, 68, 64, 526/82, 84, 201, 901

(56) References Cited

U.S. PATENT DOCUMENTS

| 4,182,810 A | 1/1980 | Willcox |
| 4,771,103 A | 9/1988 | Chiba et al. |
| 5,026,795 A | 6/1991 | Hogan |
| 5,037,905 A | 8/1991 | Cummings et al. |
| 5,385,992 A | 1/1995 | Koskinen et al. |
| 5,625,012 A | 4/1997 | Hussein et al. |
| 6,028,140 A | * 2/2000 | Collina et al. ................. 525/53 |
| 6,096,837 A | * 8/2000 | Palmroos et al. ............. 526/64 |
| 6,303,532 B1 | 10/2001 | Garoff et al. |

FOREIGN PATENT DOCUMENTS

| EP | 116248 A | 8/1984 |
| EP | 0 225 099 A3 | 11/1986 |
| EP | 0 282 929 | 9/1988 |
| EP | 0 449 519 A3 | 3/1991 |
| EP | 0 453 116 A1 | 10/1991 |
| EP | 0 517 183 A2 | 12/1992 |
| EP | 0 669 946 B1 | 9/1994 |
| EP | 0 739 917 A1 | 4/1996 |
| JP | 63046211 | 8/1986 |
| WO | 95/07943 | 3/1995 |
| WO | 96/19503 | 6/1996 |
| WO | 96/32420 | 10/1996 |

* cited by examiner

*Primary Examiner*—David W. Wu
*Assistant Examiner*—William Cheung
(74) *Attorney, Agent, or Firm*—Birch, Stewart, Kolasch & Birch, LLP

(57) ABSTRACT

The present invention relates to a process for polymerizing α-olefins in at least two stages, the first stage comprising at least one bulk reactor and optionally at least one gas phase reactor for forming the α-olefin polymer matrix and the second stage comprising at least one additional gas phase reactor for copolymerization of ethylene with said polymer matrix. In the second stage an antifouling composition is fed into said gas phase reactor(s) for preventing fouling in the second stage.

20 Claims, No Drawings

PROCESS OF PRODUCING α-OLEFIN POLYMERS

This application is the national phase under 35 U.S.C. §371 of PCT International Application No. PCT/FI00/00398 which has an International filing date of May 4, 2000, which designated the United States of America and was published in English.

The present invention relates to a process for producing poly-α-olefin compositions, in particularly polypropylene copolymer compositions having uniform quality with desired stiffness and impact strength properties and being suitable for a wide range of applications including different packaging applications.

It is known that especially polypropylene polymers have suitable resistance to heat and chemicals, and they also have attractive mechanical properties. Further, it is known that desired properties, e.g. stiffness and impact strength properties of polypropylene can be achieved by copolymerizing propylene with ethylene or other alfa-olefin monomers and optionally by adding elastomeric components to the copolymer matrix. Polypropylene copolymers can thus be used as alternatives e.g. for soft poly(vinyl chloride) (PVC). Further, polypropylene homo- or copolymers are very suitable in a wide range of applications, where emissions of chlorinated organic compounds and many other emissions should be strictly restricted.

By "α-olefin monomer" in this connection is meant an α-olefin which is capable of polymerization by the insertion (Ziegler-Natta) mechanism. An α-olefin is a compound having the structure $CH_2=CHR$, wherein R is a linear, branched or cyclic alkyl group. In particular R is a linear or branched alkyl group having 1 to 12 carbon atoms or a cyclic alkyl group having 4 to 8 carbon atoms. Typical α-olefin monomers used in the present invention are propylene, 1-butene, 4-methylpentene, 1-hexene and octene. Preferably α-olefin is propylene. Said α-olefins are copolymerized with ethylene and optionally with other α-olefins, such as butene.

Typically α-olefin copolymers are nowadays prepared with a multiphase process comprising one or more bulk and/or gas phase reactors in the presence of Ziegler-Natta catalyst system comprising a catalyst comprising a compound of a transition metal belonging to groups 4 to 6 of the Periodic Table of Elements (IUPAC 1990), and a cocatalyst based on an organic compound of a metal belonging to any of groups 1 to 3 and 13 of said Table. Typical compounds of transition metals are the chlorides, especially the tetrachloride of titanium. Typical organometallic cocatalysts are organoaluminium compounds such as aluminium alkyl compounds and especially trialkyl aluminiums. Further, this kind of catalyst system has been developed by depositing and thus solidifying the transition metal compound on a more or less inert and particulate support and by adding to the catalyst composition in the stages of its preparation several additives, among others internal and external electron donors, which act as stereoregulating agents. A typical support is magnesium chloride, typical internal electron donors are the dialkyl phthalates and typical external electron donors are the alkyl alkoxy silanes. These compounds have improved the polymerization activity, the operating life and other properties of the catalyst system and above all the properties of the polymers which are obtained by means of said catalyst system. In order further to improve the properties of such a catalyst system at least a part of it has been contacted with a small amount of monomer to give a polymer coated, so called prepolymerized catalyst or catalyst system.

The multiphase polymerization process can comprise several polymerization stages. It is common knowledge that the polymer matrix, which comprises homo/homo, homo/random or random/random (co)polymers with a comonomer content needed to obtain the desired properties, can be prepared in the first stage of the polymerization process. The first stage can comprise bulk phase and optionally gas phase reactor(s). Very often the first stage comprises one bulk and one gas phase reactor. Advanced heterophasic copolymers can be obtained, if one or more additional gas phase reactors, which are often called as rubber phase reactors, are used, combined in series with the first stage reactor(s). Copolymerization of ethylene monomer and α-olefins in the presence of the polymer matrix from the first stage is carried out in the rubber phase reactor(s), which step forms the second stage of the polymerization process.

Fouling is a common problem during the olefin polymerization process. Fouling occurs when product from the bulk reactor is transferred forward, e.g. to the flash and to the gas phase reactor for further polymerizing. The polymer product which is to be transferred is "tacky" or "sticky" and adheres to the walls of the reactor and other surfaces in flash and gas phase reactors. Further, in the gas phase reactor fouling occurs due to the static electricity caused by tacking of the charged polymer particles on the walls. Detrimental fouling is caused in the gas phase reactors by the fines. i.e. very small particles containing active catalyst. Such particles are often called "hot" catalyst particles. Especially the fouling caused by the rubbery fines in the rubber phase reactor is very detrimental for the process and the products.

It is known that the degree of fouling can to some extent be restricted by adding various antistatic chemicals to the first stage reactors. Further, addition of catalyst deactivation chemicals, known as catalyst "killers", results in killing or reducing of the catalyst activity which, in turn, reduces the formation of the tacky material.

EP Patent 669 946 discloses a two stage gas phase process for producing polypropylene copolymer wherein a gel reduction component is introduced into the first stage reactor for preventing fouling in the second stage reactor. Said gel reduction component is an electron donor and acts as a catalyst deactivator. As most preferred deactivators are cited alkylene glycols and derivatives thereof, but also methanol and ethanol are mentioned.

In U.S. Pat. No. 4,182,810 there is disclosed a method of reducing fouling during particle form polymerization of ethylene, carried out in hydrocarbon diluent, and typically in loop reactors. The fouling is caused by the adherence of polymer particles to the walls of the polymerizing reactors and reduced by adding to the reaction medium a composition comprising a mixture of polysulfone copolymer, a polymeric polyamine, an oil-soluble sulfonic acid and toluene. A typical antifouling agent containing this kind of mixture is supplied by DuPont under the trade name Stadis 450.

U.S. Pat. No. 5,026,795 describes a process for preventing fouling in a one stage gas phase copolymerization reactor by admixing an antistatic agent with a liquid carrier comprising comonomers such as 1-hexene, and introducing said mixture to the reactor. Ethylene is used as a monomer. The antistatic agent used comprises Stadis 450 type agents. It should be pointed out that only a very small amount of antistatic agent is necessary, otherwise the antistatic agent would poison or deactivate the catalyst which, according to the cited patent, is not desired.

Further, it is known that tertiary amine compositions and compositions of olefin-acrylonitrile copolymer and polymeric polyamines have been used as antistatic agents for preventing fouling in polymerization processes, especially in ethylene polymerization processes.

As the above discussion shows, a wide range of modification possibilities of polypropylene results in a wide range of applications where polypropylene can be used. However, many applications, such as medical and food packaging applications set limits to the allowable residues and emissions of the used raw materials, additives and adjuvants. Therefore, the use of many known antistatic agents is limited for a wide range of applications.

"Stadis-type" agents, such as Stadis 450, have been used as antistatic agents in polyethylene processes as is shown in the examples of the above U.S. Patents. The antistatic effect of "Stadis-type" agents may, as such, be sufficient to to reduce fouling in polyethylene polymerizing processes. However, when α-olefins are polymerized, more complicated catalyst systems are used, which in turn complicates the fouling phenomena. Polymerizing of α-olefins in this connection comprises also the copolymerizing processes of α-olefins with ethylene and/or optionally with other α-olefins. As α-olefins are preferably used propylene monomers. As was discussed above, the fouling problem in propylene multistage polymerizing processes comprising bulk and optionally gas phase reactor(s) and as well as rubber phase reactor(s) is a result not only of static electricity but also of "hot" catalyst particles, i.e. fines. When ethylene is used as a comonomer, the "hot" catalyst particles produce sticky, high ethylene containing polymer particles, "rubbery fines", in the rubber phase reactor, whereby fouling problems increase when the proportion of ethylene comonomers in the copolymer composition increases. In the other hand, the possibility to vary the ethylene comonomer content in the polymer allows a wide range of modifications. Therefore the fouling problem is not totally avoided in propylene polymerizing processes by using only an antistatic agent.

It is an object of the present invention to provide a process for polymerization of α-olefins, especially propylene, in at least two polymerization stages, where the fouling is reduced, the process comprising a first stage for forming a polymer matrix (such as a homo/homo, homo/random or random/random (co)polymer matrix) in bulk and optionally in gas phase reactor(s) and additional stages for copolymerizing ethylene and α-olefins in the presence of the polymer matrix from the first stage in at least one additional gas phase reactor, i.e. rubber phase reactor(s).

Another object of the invention is to provide a process for polymerization of α-olefins, especially propylene using the above multistage process, which is easy to run continuously without uneconomical and troublesome cleaning breaks.

Still a further object of the invention is to provide a process for polymerization of α-olefins, especially propylene, for producing α-olefin polymers having uniform quality and desired properties, such as desired stiffness and impact strength.

Further, it is an object of the present invention to provide a process for producing α-olefin polymers, which do not contain undesired residues of antifouling agents, and which can be used also e.g. in medical and food packaging applications.

It has now been found that in order to reduce fouling in α-olefin, especially propylene multistage polymerizing processes, both the static electricity and catalyst activity in fines have to be reduced. Catalyst activity in fines has to be limited to such extent that the polymerization will not be discontinued, but the fouling effect of the tines is avoided.

Stadis-type antistatic agents, which were discussed earlier in this specification, do not deactivate the active catalyst particles when used in allowable amounts and therefore they do not act as catalyst killers in the process. On the other hand it is known that ethanol is an effective catalyst killer. Ethanol would act also as an antistatic agent, but being a very effective catalyst killer or catalyst poison, its use has to be restricted to so small amounts in a polymerization process that the desired antistatic effect is not obtained. In connection with the present invention it has been found that by using a combination of suitable antistatic agent and a catalyst killer as an antifouling composition the desired aims can be achieved.

Further, it has been found that if the antifouling composition comprising antistatic agent and catalyst killer is introduced into any of the first stage reactors, the desired properties, especially the desired stiffness and impact strength of the polymer product are not achieved. Therefore, according to present invention the antifouling composition of the invention is introduced into the gas phase reactor(s) of the second stage, i.e. into the rubber phase reactor(s), in order to achieve the above desired properties of the α-olefin polymer composition, preferably polypropylene composition. However, small amounts of the sole antistatic agent, but not the antifouling composition, can be fed, and is often needed to feed, to the first stage reactors.

More specifically, the present invention is characterized by what is stated in the characterizing part of claim 1.

An important benefit of the present invention is, that the polymerization process can be carried out more economically, because the run periods are longer due to the reduced need of the cleaning breaks. This results also in more uniform quality of the product.

Next, the invention will be examined more closely with the aid of the following detailed description.

According to the present invention α-olefins are polymerized and the fouling is reduced in at least two stage process, wherein the first stage comprises the forming of the α-olefin polymer matrix in at least one bulk reactor and optionally in at least one gas phase reactor and the second stage comprises copolymerization of ethylene and α-olefins in the presence of said polymer matrix of the first stage in at least one gas phase reactor acting as a rubber phase reactor, and that an antifouling composition is fed into said rubber phase reactor.

As stated above it is an object of the present invention to prevent the fouling in multistage polymerization process of α-olefins, especially in the (co)polymerization process of propylene with ethylene and if desired with other α-olefins without impairing the properties, especially stiffness and impact strength properties of the polymer product.

According to the process of the present invention the polymerization is carried out in successive bulk and gas phase reactors in the presence of a high activity polymerization catalyst system. As a catalyst system is used a conventional catalyst system comprising a transition metal catalyst and as a cocatalyst an organometal compound, preferably an organoaluminium compound with the formula (I)

$$R_{3m-n}Al_mX_n \qquad (I)$$

wherein R is a $C_1$–$C_{12}$ alkyl, X is halogen, m is 1 or 2 and n is an integer such as $0 \leq n < 3m-1$. Preferably, the first organoaluminium compound of the formula (I) is a tri-$C_1$–$C_{12}$ alkyl aluminium, most preferably triethyl aluminium TEA.

As stereoregulating external electron donor(s) is (are) preferably used hydrocarboxy silane compounds or hydrocarboxy alkane compounds. The more preferred external donors are di-$C_4$–$C_{12}$-hydrocarbyl-di-$C_1$–$C_3$-alkoxy silane or $C_4$–$C_{12}$-hydrocarbyl-$C_1$–$C_3$-alkoxy silane, and most preferred are dicyclopentyl dimethoxy silane or cyclohexyl methyl dimethoxy silane.

Hydrogen can be added both to the bulk and gas phase reactors for controlling the molar mass of the polymer per se.

The process of the invention is carried out in at least two stages as stated above. The first stage comprises at least one bulk reactor, preferably a loop reactor, and optionally at least one gas phase reactor, preferably one gas phase reactor. The second stage comprises at least one gas phase reactor, which is usually and also in this application called as a rubber phase reactor. It is possible that the first stage comprises only a bulk reactor, where the polymer matrix is formed, and the first gas phase reactor acts as a rubber phase reactor (the second stage). However, it is more usual, that the first stage comprises one bulk and one gas phase reactor. The polymer matrix is formed from α-olefin homopolymers or copolymers with ethylene or other α-olefins, as is defined earlier in this application. In the rubber phase reactor ethylene is copolymerized with the polymer matrix. By using the multistage polymerization processes above, the molecular weight distribution (MWD) of the homo and random copolymers can be broadened to obtain optimised processability. Further, products with very low to very high MFR (melt flow rate) values can be produced. Typically the polymer compositions, prepared with the present process, have wide range of the xylene solubles (XS), typically XS is more than 10, preferably 10 to 25.

According to one embodiment of the invention the polymerization conditions for the bulk reactor of the first stage are as follows:

the temperature is within the range of 40° C. to 120° C., preferably between 60° C. and 100° C., the pressure is within the range of 20 bar to 80 bar, preferably between 30 bar to 60 bar, hydrogen can be added for controlling the molar mass in a manner known per se.

The reaction mixture from the bulk reactor is transferred to the gas phase reactor of the first stage polymerization. The polymerization conditions in the gas phase reactor are as follows:

the temperature is within the range of 50° C. to 130° C., preferably between 70° C. and 100° C.

the pressure is within the range of 5 bar to 40 bar, preferably between 25 bar to 35 bar, hydrogen can be added for controlling the molar mass in a manner known per se.

The polymerization conditions in the rubber gas phase reactor (the second stage) are same as in the gas phase reactor of the first stage.

The melt flow rates, MFR, corresponding to the molecular weights of the polymer, can vary in wide ranges depending e.g. of the comonomer contents in the polymer. MFR of the polymer are measured according to ISO 1133 standard method. For polypropylene compositions MFR is measured according to said standard at 230° C., with 2.16 kg load ($MFR_2$). The polymer composition prepared according to the present process can have the $MFR_2$ in the range of 0.03 to 2000 g/min, preferably 0.03 to 1000 g/10 min, most preferably 0.2 to 400 g/10 min.

According to the invention the antifouling composition used in the present process is a combination of an antistatic agent component and a catalyst killer component. This antifouling composition is fed into the rubber phase reactor(s) of the second stage in order to effectively prevent the fouling in the rubber phase reactor(s). In the rubber phase reactors the catalyst killer component of the antifouling composition of the invention reduces the catalyst activity in the fines, as is discussed above. Further, by feeding the antifouling composition to said second stage reactors the properties, e.g. desired stiffness and impact strength of the polymer composition, which were achieved during the first stage polymerization, will not be impaired, i.e. the desired level of these properties will be achieved. It has been noted, that if the antifouling composition were fed into the first stage reactors, the stiffness and impact strength properties tend to impair and the desired properties will not be achieved. However, small amounts of the sole antistatic agent component of the antifouling composition can be fed to the first stage reactors without effecting injuriously to the stiffness properties.

As the antistatic agent component in the antifouling composition of the invention is used a composition containing aromatic solvents (40–70 wt-%), light petroleum (10–30 wt-%), $C_{1-6}$ alkyl alcohols (1–10 wt-%), sulfonic acids (5–30 wt-%), polymeric polyamines (5–20 wt-%) and polysulfone copolymers (5–30 wt-%). The preferred aromatic solvents are toluene and xylene, the preferred $C_{1-6}$ alcohols are isopropanole and ethanol, sulfonic acids are preferably benzene sulfonic acids or naphtyl sulfonic acids, such as dodecylbenzenesulfonic acid or dinonylnaphtylsulfonic acids, and polysulfone copolymers can be e.g. 1-decene-polysulfone. A very useful antistatic agent component of the above type is an agent under the trade name Stadis 450, available by DuPont. As the catalyst killer component is used $C_{1-6}$ alcohols, preferably $C_{1-6}$ aliphatic alcohols, more preferably methanol, ethanol, propanol, or mixtures thereof. The most preferred alcohol is ethanol, which is non-toxic and easy and safe to use.

The ratio of the antistatic agent and catalyst killer in the antifouling composition used in the process of the invention is 1:4 to 4:1, preferably 1:2 to 2:1, by weight. The total amount of the antifouling composition to be incorporated to the rubber phase reactor in order to prevent the fouling but not effecting injuriously to the polymerization process itself is between 10–1000 wt-ppm, preferably 20–500 wt-ppm, more preferably 30–150 wt-ppm, calculated on the basis of the product obtained. The antifouling composition can be fed into the rubber reactor(s) continuously from an antifouling composition container by means of a pump or pumps.

By using the process of the invention the fouling the can be reduced considerably. The combination of the antistatic agent and suitable alcohol as the catalyst killer improves the operability of the process compared to that if only antistatic agent were used. By using ethanol in the amounts as stated above as the catalyst killer component the activity of the catalyst in fines can be kept under control. Further, changes in the ethanol feed give the response on catalyst activity in fines very fast allowing controlling the activity in the rubber phase reactor very easily. If, for instance, the catalyst activity is low in the loop reactor, like when running lower ethylene content or products with lower MFR, then higher ethanol feed to rubber phase reactor is required to keep reaction in desired level still in the rubber phase.

In the following examples the invention will be described more detailed.

WORKING EXAMPLE 1

The objective for the product was to produce heterophasic copolymer for Injection Moulding (Thin Wall Packaging).

The matrix part of polymer was produced in the Loop—$1^{st}$ gas phase reactor (GPR) combination. The rubber part of polymer was produced in $2^{nd}$ GPR. From product point of view the most important was to reach good stiffness—impact strength balance. Requirements for the final product were as follows: $MFR_2$=13 g/10 min, $C_2$=6.5 wt-%, Flexural Modulus=1520 MPa, Charpy RT=9 kg/m$^2$.

Catalyst

A highly active propylene polymerisation catalyst of Ziegler-Natta (ZN) type, prepared according to Finnish Patent No. 88047 was used.

Polymerisation of the Matrix Part

Said mixture of the catalyst and viscous medium was fed with non valve piston pump according to Finnish patent No. 94164. The catalyst was contacted with triethylaluminium (TEA) and dicyclopentyldimethoxysilane (donor D) in pipeline. Al/Ti molar ratio was about 300 mol/mol and Al/D molar ratio was 5 to 7. The activation time between catalyst, cocatalyst and donor was 15 seconds before these chemicals were fed to polymerisation.

The catalyst was flushed with propane to the continuous prepolymerisation reactor in which also TEA and D-donor were fed. Prepolymerisation loop-reactor was operated at the temperature of 25 to 30° C. and 55 bar pressure.

The residence time of the particles was 8–10 minutes. Hydrogen feed to prepolymerisation reactor was 0.1 to 0.2 mol-%. The prepolymerised catalyst component was used in a loop reactor and a gas phase reactors connected in series.

The operating temperature in loop reactor was 80° C. and the pressure was 55 bar. The residence time in the loop reactor was 0.6 to 1.3 h.

The $1^{st}$ gas phase reactor was operated at 80° C. and 35 bar total pressure. The production split between loop and gas phase reactor was about 60/40 wt-%/wt-%. The residence time in GPR was 0.7 to 1.3 h.

The MFR (2.16 kg/230° C.) of the matrix part was controlled to be about 20 in both reactor (loop and $1^{st}$ GPR) via hydrogen feed. The isotacticity of matrix was controlled to be as high as possible by donor feed.

Polymerisation of the Rubber Part

The polymerisation temperature in $2^{nd}$ GPR was 70° C. and the total pressure 18.5 bar. The comonomer gas ratio ($C_2/C_3$) was kept as constant in value 0.54 mol/mol. The molecular weight of the product and intrinsic viscosity of the amorphous part (IV/AM) was controlled by hydrogen/ethylene($H_2/C_2$) molar ratio.

The amount of rubber, which refers to the amount of xylene solubles (XS), was controlled by the production split in. The production split between loop and gas phase reactor was about 85/15 wt-%/wt-%. The residence time in $2^{nd}$ GPR was about 1 hour.

Antifouling Composition Feed

As an antifouling composition was used a mixture of STADIS 450/Ethanol (2/1 wt-%/wt-%), which was fed to the fluidised bed of $2^{nd}$ GPR (rubber phase reactor) in order to prevent fouling. Because the main reason for fouling in rubber reactoris the finest particles which are floating near on reactor walls and in circulation gas line, fines were killed and the static electricity was removed by STADIS 450/ethanol mixture, whereby the fouling was prevented effectively.

The amount of STADIS 450/Ethanol mixture feed was 30 wt-ppm calculated from product outlet of the $2^{nd}$ GPR. STADIS 450/Ethanol mixture was fed as 2 wt-% solution in pentane by metering pump.

Results

No fouling was observed in $2^{nd}$ GPR and gas circulation line of $2^{nd}$ GPR after 16 days continuos running.

Polymerisation conditions are shown in table 1. Product characteristics are shown in table 2.

WORKING EXAMPLE 2

The procedure was the same as in example 1 but the objective for the product was to produce polymer for Injection Moulding (low emission/odour for Automotive Interior). Requirements for the final product were as follows: $MFR_2$=22 g/10 min, $C_2$=7.5 wt-%, Flexural Modulus=1430 MPa, Charpy RT=9 kg/m$^2$.

The mixture of STADIS 450/Ethanol feed into the fluidised bed of the $2^{nd}$ GPR (rubber phase reactor) was 40 wt-ppm calculated from product outlet of the $2^{nd}$ GPR. There was no fouling observed in $2^{nd}$ GPR and gas circulation line of $2^{nd}$ GPR after 12 days continues running.

Polymerization conditions are shown in table 1. Product characteristics are shown in table 2.

COMPARATIVE EXAMPLE 3

The method was the same as in example 1 but not any STADIS/Ethanol mixture was fed to $2^{nd}$ GPR. As a result big chunks of polymer was formed in the reactor and the outlet of the reactor was plugged after one and half days continues run. The run has to be stopped and the reactor was opened. When the reactor was opened there was found a bad and deep fouling layer in the reactor.

Polymerisation conditions are shown in table 1. There are no product characteristics due to the fouling and plugging of the reactor.

WORKING EXAMPLE 4

The method was the same as in example 1 the matrix part was produced only in loop reactor and the $1^{st}$ GPR was used as a rubber reactor. Objective was to make very soft heterophasic product (random-block PP material) having low temperature impact strength and moderate stiffness.

The MFR of the matrix was controlled to be 13 g/10 min by hydrogen feed and the ethylene content was controlled to be about 4 wt-% by ethylene feed.

The loop reactor was operated at the temperature of 68° C. and having the pressure of 38 barg. The operating temperature in rubber gas phase reactor was 75° C. and the pressure 13 bar. The split between matrix and rubber was kept in value 80/20 wt-%.

Antifouling Composition Feed

The mixture of STADIS/Ethanol (2/1 wt-%/wt-%) was fed into fluidised bed of the rubber reactor and the amount was 400 wt-ppm calculated from the product outlet.

Results

There was no fouling observed after 14 days continuos running. Pressure differences etc. measured from gas phase reactor were normal during the run. The rubber gas phase reactor was opened after this test run and it was very clean.

Polymerisation conditions are shown in table 1. Product characteristics are shown in table 2.

COMPARATIVE EXAMPLE 5

The procedure was the same as in example 4 but not any STADIS nor ethanol were fed to rubber gas phase reactor. There was a lot of operability problems very early in rubber reactor and chunks formed after one day running. Finally the distribution plate and the outlet of the gas phase reactor plugged and the run had to be terminated. The reactor was opened and there was very bad fouling layer on the reactor walls.

Polymerisation conditions are shown in table 1. There are no product characteristics due to the fouling and plugging of the reactor.

TABLE 2

Product characteristics

| Product characteristics* | | Working Example 1 | Working Example 2 | Working Example 4 |
|---|---|---|---|---|
| XS | wt % | 15.6 | 18.8 | 20.5 |
| AM | wt % | 13.8 | 17.5 | NM |
| IV/AM | dl/g | 3.6 | 3.4 | 1.96 |
| C2 | wt % | 6.4 | 7.3 | 13.8 |
| C2/AM | wt % | 35.4 | 34.3 | 30.8 |
| MFR2 | g/10 min | 13 | 20 | 6.4 |
| Tm of PP | ° C. | 165.9 | 165.2 | 140.4 |
| Flexural Modulus | MPa | 1520 | 1430 | 530 |
| Charpy, notched, RT | kJ/m2 | 9 | 9.5 | 45.3 |

The product characteristics were measured using the following methods:

Xylene soluble fraction (XS) and amorphous fraction (AM):

TABLE 1

Polymerization conditions

| | | Working Example 1 | Working Example 2 | Comparative Example 3 | Working Example 4 | Comparative Example 5 |
|---|---|---|---|---|---|---|
| Catalyst | | ZN-TYPE | ZN-TYPE | ZN-TYPE | ZN-TYPE | ZN-TYPE |
| Cat feed | g/h | 2.1 | 2.2 | 2.1 | 1.5 | 1.5 |
| Al/Ti | mol/mol | 320 | 300 | 320 | 350 | 350 |
| Al/D | mol/mol | 6 | 5.5 | 6 | 7 | 7 |
| D/Ti | mol/mol | 53 | 55 | 53 | 50 | 50 |
| Donor | type | D | D | D | D | D |
| 100% Donor feed | g/t C3 | 40 | 39 | 40 | 40 | 40 |
| 100% TEAL feed | g/t C3 | 150 | 130 | 150 | 180 | 180 |
| Prepol. | | | | | | |
| Temperature | ° C. | 30 | 30 | 30 | 25 | 25 |
| pressure | bar | 55 | 55 | 55 | 38 | 38 |
| Stability | | GOOD | GOOD | GOOD | GOOD | GOOD |
| Loop, matrix | | | | | | |
| Temperature | ° C. | 80 | 80 | 80 | 68 | 68 |
| pressure | bar | 50 | 50 | 50 | 38 | 38 |
| slurry dens. | kg/m3 | 420 | 391 | 420 | 435 | 435 |
| solid content | wt % | 19.5 | 19.5 | 19.5 | 22 | 22 |
| Production rate | kg/h | 54.2 | 53.9 | 54.2 | 14 | 14 |
| Residence time | h | 0.7–0.9 | 0.6–0.8 | 0.7–0.9 | 1.3 | 1.3 |
| Stability | | GOOD | GOOD | GOOD | GOOD | GOOD |
| Split | wt % | 55 | 48 | 55 | 80 | 80 |
| 1st GPR, matrix | | | | | not in use | not in use |
| Temperature | ° C. | 80 | 80 | 80 | | |
| Total pressure | bar | 34 | 34.5 | 34 | | |
| C3 conc | mol % | 63.3 | 60.2 | 63.3 | | |
| H2/C3 | mol/kmol | 78 | 126 | 78 | | |
| Production rate | kg/h | 29 | 40.4 | 29 | | |
| Residence time | h | 2.1 | 1.8 | 2.1 | | |
| Stability | | GOOD | GOOD | GOOD | | |
| Split | % | 30 | 35 | 30 | | |
| 2nd GPR, rubber | | | | | | |
| Temperature | ° C. | 70 | 70 | 70 | 75 | 75 |
| Total pressure | bar | 19 | 18.8 | 19 | 13 | 13 |
| Stadis/ethanol feed | wt ppm | 30 | 40 | no feed | 400 | no feed |
| C3 conc | mol % | 43.1 | 42.5 | 43.1 | 32 | 32 |
| H2/C2 | mol/kmol | 68 | 76 | 68 | 0.35 | 0.35 |
| C2/C3 | mol/mol | 0.54 | 0.54 | 0.54 | 0.54 | 0.54 |
| Production rate | kg/h | 15 | 19 | 15 | 3.5 | 3.5 |
| Residence time | h | 1.2 | 1 | 1.2 | 1.3 | 1.3 |
| Stability | | GOOD | GOOD | VERY POOR | GOOD | VERY POOR |
| Split | wt % | 15 | 17 | 15 | 20 | 20 |

2.0 g of polymer are dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered with filter paper into two 100 ml flasks.

The solution from the first 100 ml vessel is evaporated in nitrogen flow and the residue is dried under vacuum at 90° C. until constant weight is reached.

$$XS\ \% = (100 \times m_1 \times v_0)/(m_0 \times v_1)$$

$m_0$=initial polymer amount ( g)

$m_1$=weight of residue (g).

$v_0$=initial volume (ml)

$v_1$ volume of analysed sample ( ml)

The solution from the second 100 ml flask is treated with 200 ml of acetone under vigorous stirring. The precipitate is filtered and dried in a vacuum oven at 90° C.

$$AM = (100 \times m_2 \times v_0)/(m_0 \times v_1)$$

$m_0$=initial polymer amount ( g)

$m_2$=weight of precipitate (g)

$v_0$=initial volume (ml)

$v_1$ volume of analysed sample ( ml)

IV/AM (IV of AM): ISO 1628

$MFR_2$: ISO 1133 (230° C., 2,16 kg load)

$T_m$, melting temperature: ISO 11357

Flexural modulus: ASTM D790, ISO 178

Charpy, notched. RT: ISO179/leA

The amount of Stadis/ethanol fed to the process is very low and most of it evaporates in flash and in product dryer after polymerisation. There are not found any residuals of undesired chemicals of the antifouling composition in the end product. Further, there are very low taste and odour levels of the products where stadis/ethanol have been used.

What is claimed is:

1. A process for polymerizing α-olefins capable of polymerization by an insertion mechanism using a Ziegler-Natta catalysts system in at least two stages, wherein
   (i) a first stage, where polymerization of an α-olefin to form a polymer matrix is carried out in at least one bulk reactor, and
   (ii) a second stage, where copolymerization of ethylene and α-olefin(s) in the presence of said polymer matrix from the first stage is carried out in at least one gas phase reactor,
   and wherein an antifouling composition comprising a mixture of an antistatic agent and a catalyst killer agent is fed into said gas phase reactor(s) of the second stage, but not into said reactor(s) of the first stage.

2. The process according to claim 1, wherein polymerization of the α-olefin to form a polymer matrix is carried out in at least one bulk reactor and in at least one gas phase reactor.

3. The process according to claim 1 or 2, wherein the antifouling composition used comprises a mixture, which contains aromatic solvents 30–70 wt-%, light petroleum 10–30 wt-%, $C_{1-6}$ alkyl alcohols 1–10 wt-%, sulfonic acids 5–30 wt-%, polymeric polyamines 5–20 wt-% and polysulfone copolymers 5–30 wt-%, the weight percentages being calculated from the total weight of the composition, and the catalyst killer agent used comprises $C_1$–$C_6$ alkyl alcohols.

4. The process according to claim 3, wherein the catalyst killer agent is methanol, ethanol, propanol or mixtures thereof.

5. The process according to claim 4, wherein the catalyst killer agent is ethanol.

6. The process according to claim 3, wherein the antistatic agent is a mixture containing toluene and/or xylene, isopropanol, light petroleum, benzenesulfonic acid or naphtylsulfonic acid and 1-decene polysulfone.

7. The process according to claim 1, wherein the antifouling composition comprises said antistatic agent and catalyst killer agent in a ratio of 1:4 to 4:1 by weight.

8. The process according to claim 1, wherein the antifouling composition comprises said antistatic agent and catalyst killer agent in a ratio of 1:2 to 2:1 by weight.

9. The process according to claim 1, wherein said antifouling composition is used in an amount of 10 to 1000 wt-ppm, calculated on the basis of the weight of the obtained outlet product from the second stage.

10. The process according to claim 9, wherein said antifouling composition is used in an amount of 20 to 500 wt-ppm, calculated on the basis of the weight of the obtained outlet product from the second stage.

11. The process according to claim 9, wherein said antifouling composition is used in an amount of 30 to 150 wt-ppm, calculated on the basis of the weight of the obtained outlet product from the second stage.

12. The process according to claim 1, wherein in the first stage there is formed by polymerization an α-olefin polymer matrix comprising propylene homopolymer or propylene copolymer with other α-olefins and/or ethylene.

13. The process to claim 1, wherein the first stage comprises one bulk reactor and one gas phase reactor, and the second stage comprises at least one gas phase reactor.

14. The process according to claim 13, wherein the first stage comprises at least one loop reactor and one gas phase reactor, and the second stage comprises at least one gas phase reactor.

15. The process according to claim 1, wherein the first stage comprises only at least one bulk reactor, and the first gas phase reactor forms the second stage reactor.

16. The process according to claim 15, wherein the first stage comprises at least one loop reactor, and the first gas phase reactor forms the second stage reactor.

17. The process according to claim 1, wherein the catalyst system comprises a compound of a transition metal belonging to group 4 to 6 of the Periodic Table of Element (IUPAC 1990), an organometallic cocatalyst and electron donors.

18. The process according to claim 1, wherein the catalyst system comprises a transition metal catalyst and as a cocatalyst an organoaluminium compound, and as external electron donor or donors hydrocarboxy silane or hydrocarboxy alkane compounds.

19. A process for producing an injection moulded article which comprises injection molding a copolymer prepared by a process according to claim 1.

20. The process according to claim 19, wherein the injection moulded article comprises a thin wall packaging.

* * * * *